(12) United States Patent
Gotou et al.

(10) Patent No.: US 6,508,094 B1
(45) Date of Patent: Jan. 21, 2003

(54) INTERNALLY-TOOTHED MEMBER, AND METHOD AND APPARATUS FOR MOLDING SAME

(75) Inventors: Masahiro Gotou, Anjo (JP); Osamu Fukukawa, Anjo (JP); Masaki Saitou, Anjo (JP); Hideyuki Nagai, Anjo (JP); Hiroshi Katou, Anjo (JP)

(73) Assignee: Aisin AW Co., Ltd. (JP)

( * ) Notice: Subject to any disclaimer, the term of this patent is extended or adjusted under 35 U.S.C. 154(b) by 17 days.

(21) Appl. No.: 09/606,695

(22) Filed: Jun. 30, 2000

(30) Foreign Application Priority Data

Jun. 30, 1999 (JP) .............................. 11-185310
Jun. 9, 2000 (JP) ...................... 2000-174315

(51) Int. Cl.⁷ .............................................. B21D 22/00
(52) U.S. Cl. .................................. 72/85; 72/84; 72/110
(58) Field of Search ............................... 72/82, 83, 84, 72/85, 95, 96, 110, 111; 29/893.32

(56) References Cited

U.S. PATENT DOCUMENTS

| | | | | |
|---|---|---|---|---|
| 5,384,949 A | * | 1/1995 | Wodrich et al. | 72/84 |
| 5,711,174 A | * | 1/1998 | Dohi et al. | 72/83 |
| 5,906,127 A | * | 5/1999 | Nakamura | 72/85 |
| 5,934,126 A | * | 8/1999 | Maruki et al. | 72/85 |
| 6,026,666 A | * | 2/2000 | Zimmermann et al. | 72/85 |
| 6,253,589 B1 | * | 7/2001 | Putz et al. | 72/85 |

FOREIGN PATENT DOCUMENTS

DE 197 22 359 * 12/1998 ............ B21K/1/30

* cited by examiner

Primary Examiner—Ed Tolan
(74) Attorney, Agent, or Firm—Lorusso & Loud

(57) ABSTRACT

The present invention provides an internally-toothed member of reduced size and enhanced quality, durability and productivity in manufacture. This internally-toothed member has a first cylinder portion and a second cylinder portion which is larger in diameter than the first cylinder portion. First and second internal teeth are formed to protrude radially inwardly from inner peripheral surfaces of the first and second cylinder portions respectively. Because a meshing portion can be formed as second internal teeth protruding from an inner periphery of the second cylinder portion, the diameter of the internally-toothed member is relatively small. Because the area between the second internal teeth and a concave portion and the concave portion itself do not decrease in thickness during formation of the second internal teeth, it is possible to prevent cracking and to thereby enhance durability of the internally-toothed member. Further, because there is no sagging of the inner peripheral surface of the meshing portion, the quality of the internally-toothed member is further enhanced.

4 Claims, 19 Drawing Sheets

INTERNALLY-TOOTHED MEMBER, AND METHOD AND APPARATUS FOR MOLDING SAME

INCORPORATION BY REFERENCE

The disclosure of Japanese Patent Application No. H11-185310 filed on Jun. 30, 1999 and that of Japanese Patent Application No. 2000-174315, filed Jun. 30, 1999, including the specification, drawings and abstract of each, are incorporated herein by reference in their entirety.

BACKGROUND OF THE INVENTION

1. Field of the Invention

The present invention relates to an internally-toothed member, and to a method and apparatus for molding same.

2. Description of the Related Art

In general, an automatic transmission employs a planetary gear unit which is composed of a sun gear, a pinion, a ring gear and a carrier. Gear elements such as the sun gear, the ring gear and the carrier are selectively operated by frictional engagement elements such as clutches and brakes, whereby a speed-change operation is made possible.

First and second rotational members in the automatic transmission are selectively coupled, for example, by engaging and disengaging a clutch. For this purpose, the clutch has a drum, a clutch hub, a plurality of clutch plates, a plurality of clutch discs, and a hydraulic servo. The drum is designed as an internally-toothed member which is coupled to the first rotational member and which is itself rotatably mounted. The clutch hub is mounted for rotation relative to the drum. The clutch plates are spline-engaged at their outer peripheral edges with the drum. The clutch discs are spline-engaged at their inner peripheral edges with the clutch hub. The hydraulic servo engages and disengages the clutch by selectively pressing the clutch plates and clutch discs together and releasing same.

The drum and the first rotational member are coupled to each other by a meshing engagement. For this purpose, a meshing portion is formed at a tip end of the drum by means of a molding method such as corrugation molding (Cam molding).

FIG. 2 is a longitudinal sectional view of the essential part of a drum having a meshing portion formed as a molded corrugation by the method of the related art. FIG. 3 is an enlarged view of the meshing portion formed as the molded corrugation by the method of the related art.

In the drawings, drum 1 is shown as composed of a tubular trunk portion 12 and an annular disc portion 13. A splined tooth 14 is formed at a predetermined position on an inner periphery of the trunk portion 12, for example, by means of cutting. A meshing portion 15 is formed at a tip end of the trunk portion 12 by means of corrugation molding. The meshing portion 15 is composed of non-worked (non-processed) portions P1 and worked (processed) portions P2. The non-worked portions P1 and the worked portions P2 are arranged alternately around the circumference with an equal spacing (pitch) therebetween. The worked portions P2, which remain equal in thickness to the non-worked portions P1, are extruded radially outwardly.

However, in the method of molding the drum 11 according to the related art, during formation of the meshing portion, the worked portions P2 are extruded radially outwardly while remaining equal in thickness to the non-worked portions P1. This leads to a corresponding increase in diameter of the drum 11 and causes enlargement of the drum 11 Further, as the worked portions P2 are extruded, step portions R1, R2 between the non-worked portions P1 and the worked portions P2 become thinner. As a result, cracks are generated in the step portions R1, R2 the drum becomes less durable. Furthermore, a corner portion Q of the inner peripheral surface of the meshing portion 15 may sag as illustrated in FIG. 3. This reduces the quality of the drum 11.

Further, a step for molding the tooth 14 and a step for extruding the worked portions P2 both require man-hours of labor to the detriment of productivity in manufacture of the drum 11. Besides, precision in positioning of the spline teeth 14 and of the meshing portion 15 suffers. As a result, the quality of the drum 11 also suffers.

Hence, slot extraction has been considered for forming the meshing portion. FIG. 4 is a longitudinal sectional view of the relevant part of a drum having a meshing portion formed by the slot extraction of the related art.

FIG. 4 drawing shows a drum 21 as being composed of a tubular trunk portion 22 and an annular disc portion 23. A spline tooth 24 is formed at a predetermined position on an inner periphery of the trunk portion 22, for example by cutting. A meshing portion 25 is formed at a tip end of the trunk portion 22 by means of slot extraction. The meshing portion 25 is composed of non-worked portions P3 and worked portions P4. The non-worked portions P3 and the worked portions P4 are arranged alternately around the circumference with equal spacing (pitch) therebetween. The worked portions P4 are punched so that slots are formed.

However, a centrifugal force is applied to the trunk portion 22 as the drum 21 rotates. Thus, if the rotational speed of the drum 21 becomes high in use in the automatic transmission the non-worked portions P3 may be deformed as shown in the drawing. As a result, the durability of the drum 21 may suffer.

Further, since the process requires a separate molding step to form the spline tooth 24 and a punching step to form the worked portions P4, the process becomes labor-intensive and the productivity in manufacture of the drum 21 suffers. Besides, precision in positioning of the spline teeth 24 relative to the meshing portion 25 is difficult to attain, to the detriment of drum quality.

SUMMARY OF THE INVENTION

Accordingly, the objective of the present invention is to provide a solution to the above-mentioned problems of the related art. Thus, it is an object of the present invention to provide an internally-toothed member, a method of molding the internally-toothed member, and an apparatus for molding the internally-toothed member such that its size can be reduced, while enhancing its quality, durability and productivity in manufacture.

To achieve the forgoing objects, according to a first aspect of the present invention, there is provided an internally-toothed member comprising a first cylinder portion and a second cylinder portion which is larger in diameter than the first cylinder portion, wherein first and second internal teeth are formed so as to protrude radially inwardly from inner peripheral surfaces of the first and second cylinder portions, respectively.

In this case, since the meshing portion is formed with the second internal teeth protruding from the inner peripheral surface of the second cylinder portion, there is no need to increase the diameter of the internally-toothed member. Accordingly, the internally-toothed member can be reduced in size.

Further, the space between the second internal teeth and the concave portion does not thin during formation of the second internal teeth. Therefore, it is possible to prevent generation of cracks and enhance durability of the internally-toothed member. In addition, since there is no sagging at the inner peripheral surface of the meshing portion, the quality of the internally-toothed member can be further enhanced.

Further, the second internal teeth portion is integrally coupled to the concave portion. Therefore, even if a centrifugal force has been applied to the internally-toothed member during rotational movement thereof, the second internal teeth portion, the concave portion and the like are not deformed. Accordingly, the durability of the internally-toothed member can be enhanced.

In the first aspect of the present invention, the internally-toothed member may be a drum of a clutch. In this case, the second teeth may be separated by axially formed grooves.

In this case, the grooves are formed in the inner peripheral surface of the second internal teeth portion so as to extend in the axial direction. Accordingly, lubricating oil circulating inside the internally-toothed member can easily be drawn out through the groove. Also, formation of the grooves leads to a corresponding decrease in weight of the internally-toothed member.

In the first aspect or the present invention, an annular flat portion may be formed as a coupling portion between the first and second cylinder portions.

In this case, it is possible to prevent plastic flow of the material from affecting the meshing portion during formation of the splines. Accordingly, the meshing portion can easily be formed.

In the first aspect of the present invention, the internally-toothed member may be a drum of a clutch for an automatic transmission. In this case, an engaging surface for a band brake may be formed on an outer peripheral surface of the first cylinder portion. Also, the first internal teeth may be splines for spline-engaging the drum with a clutch plate, and the second internal teeth may be a meshing portion for coupling the drum to another component of the automatic transmission.

In this case, since the first meshing portion can be formed by forming the convex portions so as to protrude from the inner peripheral surface of the second cylinder portion, the drum does not increase in diameter. Further, since there is no need to form the meshing portion by corrugation molding, there is no possibility of the worked portions formed by corrugation molding being extruded radially outwardly. Accordingly, the drum can be reduced in size. As a result, it is possible to prevent the drum from interfering with another component in the automatic transmission.

Also, since the drum has a tubular shape, the outer peripheral surface of the drum can be used as the engaging surface for the band brake.

According to a second aspect of the present invention, there is provided a method of forming an internally-toothed member, comprising the steps of deforming a material by causing it to undergo plastic flow so that a first cylinder portion and a second cylinder portion, which is larger in diameter than the first cylinder portion, are formed, and forming first and second internal teeth so as to protrude radially inwardly from inner peripheral surfaces of the first and second cylinder portions.

In this case, since the first and second internal teeth can be formed by a single step of roll forming machining, the man-hours of labor are decreased and, as a result, the productivity of manufacture of the internally-toothed member can be enhanced. Further, since the precision of positioning the first and second internal teeth relative to each other can be assured, the quality of the internally-toothed member can be yet further enhanced.

In the second aspect of the present invention, the blank material may be pressed against a mandrel by a plurality of pressing means which are disposed at different positions relative to the axial and radial dimensions of the mandrel.

In this case, the pressing means are disposed at different positions relative to the axial and radial dimensions of the mandrel. Therefore, the blank material is sequentially pressed against the mandrel by the pressing means and becomes thinner as roll forming machining proceeds. In this manner, the material is gradually made thinner. Thus, even in the case where the material is thick, a sufficiently thin internally-toothed member can be molded by means of roll forming machining without adversely affecting its quality.

According to a third aspect of the present invention, there is provided a molding apparatus for producing an internally-toothed member comprising a mandrel having a first tooth die portion formed to correspond to a first cylinder portion of the internally-toothed member and a second tooth die portion formed to correspond to a second cylinder portion which is larger in diameter than the first cylinder portion, a holding member for sandwiching a material blank together with the mandrel, and pressing means for pressing the material against the mandrel and deforming the material by causing it to undergo plastic flow.

In this case, since the first and second internal teeth can be formed by a single step of roll forming machining so as to correspond to the first and second tooth die portions, the man-hour requirement decreases. As a result, the productivity of the manufacture of the internally-toothed member is enhanced. Besides, since the precision of positioning between the first and second internal teeth can be assured, the quality of the internally-toothed member can be further enhanced.

In the third aspect of the present invention, a plurality of pressing means may be used. In this case, the pressing means may be disposed at different positions relative to the axial and radial dimensions of the mandrel.

In this case, since the pressing means are disposed at different locations relative to the axial and radial dimensions of the mandrel, the blank material is sequentially pressed against the mandrel and becomes thinner as roll forming machining proceeds. In this manner, the material is gradually made thinner. Therefore, even in the case where the material is thick, a sufficiently thin internally-toothed member can be molded by means of roll forming machining without adversely affecting its quality.

In the third aspect of the present invention the molding apparatus may comprise displacement processing means for radially displacing the pressing means.

In this case, since the displacement processing means radially displaces the pressing means, the precision location of the first and second internal teeth can be enhanced.

In the third aspect of the present invention, the displacement processing means may radially outwardly displace the pressing means when a step between the first and second tooth die portions approaches the pressing means.

In the third aspect of the present invention, a convex portion for bending the material towards the mandrel may be formed on a molding surface of the pressing means.

In this case, when the blank material is shaped by the convex portion of the molding surface, the outer peripheral edge of the material is curved by the convex portion into relatively close proximity to the outer peripheral surface of the mandrel. Accordingly, it is possible to reduce the tensile stress in forming a boundary portion between the trunk portion and the bottom portion. Therefore, the boundary portion between the trunk portion and the bottom portion can be made to have a sufficient thickness.

In the third aspect of the present invention, a steep incline portion for pressing the material against the step may be formed on a molding surface of the pressing means.

In this case, since the material can sufficiently be pressed against the root of the step by the steep incline portion, the precision of the first and second internal teeth is further enhanced.

BRIEF DESCRIPTION OF THE DRAWINGS

The foregoing and further objects, features and advantages of the present invention will become apparent from the following description of a preferred embodiment with reference to the accompanying drawings, wherein.

DESCRIPTION OF THE PREFERRED EMBODIMENTS

Hereinafter a preferred embodiment of the present invention will be described in detail with reference to the drawings.

Figure 5:
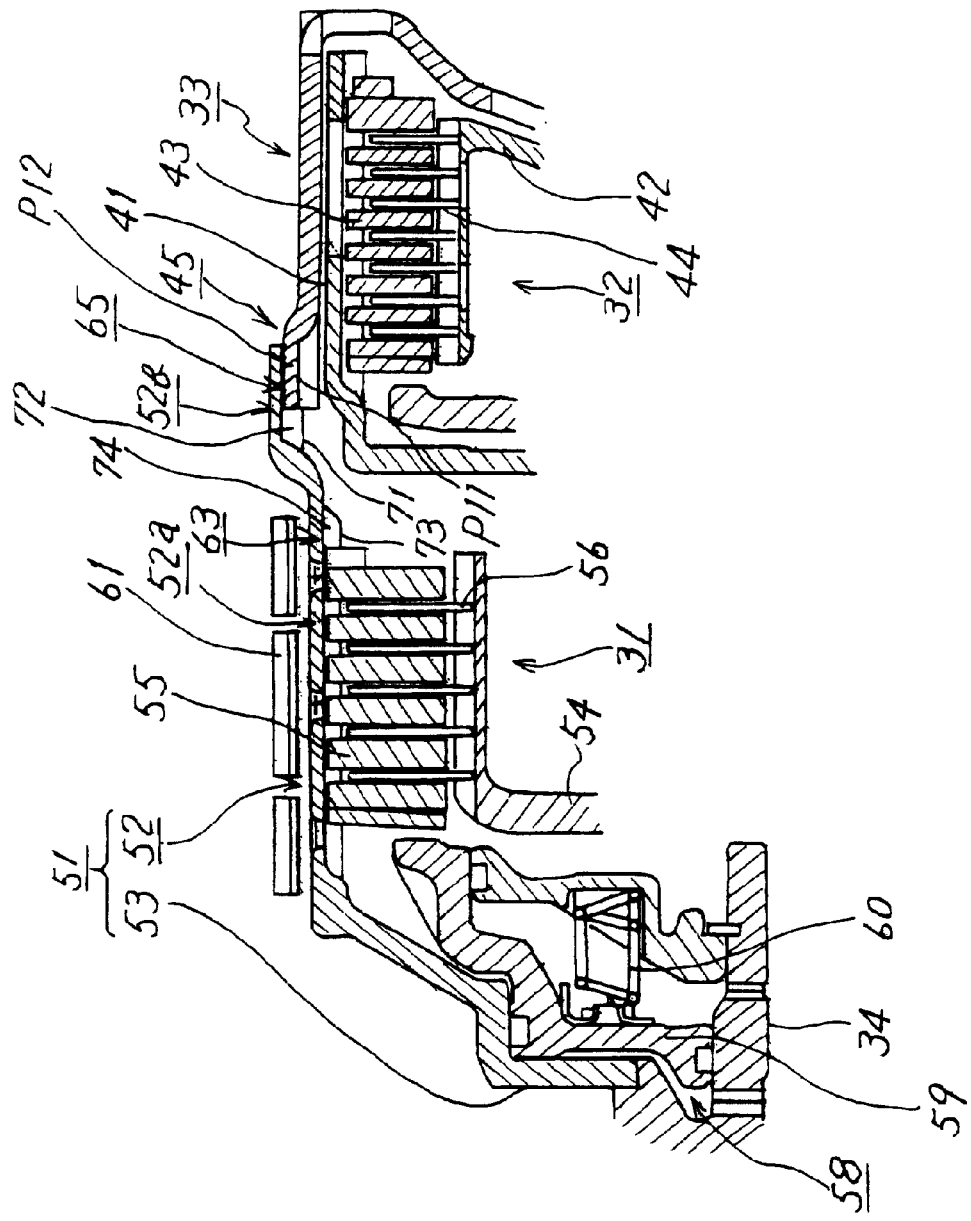
FIG. 5 is a sectional view of the essential part of an automatic transmission in accordance with the embodiment of the present invention.

FIG. 5 shows a portion of an automatic transmission incorporating a preferred embodiment of the present invention. As shown in FIG. 5, the automatic transmission includes first and second clutches 31, 32 which serve as frictional engagement elements, a tubular coupling body 33 designed as a first rotational member which is rotatably mounted, and a sleeve 34 which is also rotatably mounted.

The first clutch 31 is coupled to the coupling body 33. The first clutch 31 is also coupled to a drum 51, which is a rotatably mounted internally-toothed member in accordance with the present invention, and to a second rotational member (not shown). The first clutch 31 has a clutch hub 54 which is disposed to be rotatable relative to the drum 51, a plurality of clutch plates 55 whose outer peripheral edges are spline-engaged with the drum 51, a plurality of clutch discs 56 whose inner peripheral edges are spline-engaged with the clutch hub 54, and a hydraulic servo 58 which engages and disengages the first clutch 31 by selectively pressing or releasing the clutch plates 55 and the clutch discs 56.

The drum 51 is composed of a tubular trunk portion 52 and an annular bottom portion 53. The trunk portion 52 has a first cylinder portion 52a and a second cylinder portion 52b. The first 14 cylinder portion 52a has a predetermined diameter, and the second cylinder portion 52b is enlarged towards an opening of the drum 51 and is larger in diameter than the first cylinder portion 52a. By means of roll forming, a spline 63 is formed on an inner peripheral surface of the first cylinder portion 52a, and a first meshing portion 65 is formed on an inner peripheral surface of the second cylinder portion 52b. The spline 63 is composed of spline teeth 73 and spline grooves 74. The spline teeth 73 and the spline grooves 74 are arranged alternately around the circumference of the drum. The spline teeth 73 are referred to herein as "first internal teeth" and protrude radially inwardly at an equal pitch. The spline grooves 74 are formed among the spline teeth 73. The first meshing portion 65 is composed of convex portions 71 and concave portions 72. The convex portions 71 and the concave portions 72 are arranged alternately around the circumference of the drum. The convex portions 71 are referred to herein as "second internal teeth" and are formed to protrude radially inward with an equal spacing (pitch). The concave portions 72 are formed among the convex portions 71. The spline teeth 73, the spline grooves 74, the convex portions 71 and the concave portions 72 are all extended in the axial direction.

A band brake 61 is disposed on an outer periphery of the drum 51. An engaging surface of the band brake 61 is formed on an outer peripheral surface of the drum 51.

Accordingly, by engaging and disengaging the band brake 61, it becomes possible to selectively stop the drum 51. The hydraulic servo 58 is composed of a piston 59 slidably disposed within the bottom portion 53, a spring 60 urging the piston 59 towards the bottom portion 53, and the like.

The second clutch 32 is coupled to a drum 41 and the second rotational member. Moreover, the second clutch 32 has a clutch housing 42 which is mounted for rotation relative to the drum 41, a plurality of clutch plates 43 whose outer peripheral edges are spline-engaged with the drum 41, a plurality of clutch discs 44 whose inner peripheral edges are spline-engaged with the clutch hub 42, and a hydraulic servo (not shown) which engages and disengages the second clutch 32 by selectively pressing or releasing the clutch plates 43 and the clutch discs 44.

The drum 51 and the coupling body 33 are coupled by meshing with each other. For this purpose, a second meshing portion 45 is formed at a tip end of the coupling body 33 by means of a method such as cold forging, press working, or glove rolling. The second meshing portion 45 is composed of non-worked portions P11 and worked portions P12. The non-worked portions P11 and the worked portions P12 are arranged alternately around the circumference with an equal pitch. The worked portions P12, which remain equal in thickness to the non-worked portions P11, are extruded radially outwardly. The convex portions 71 are engaged with the non-worked portions P11, and the concave portions 72 are engaged with the worked portions P12.

Figure 1:
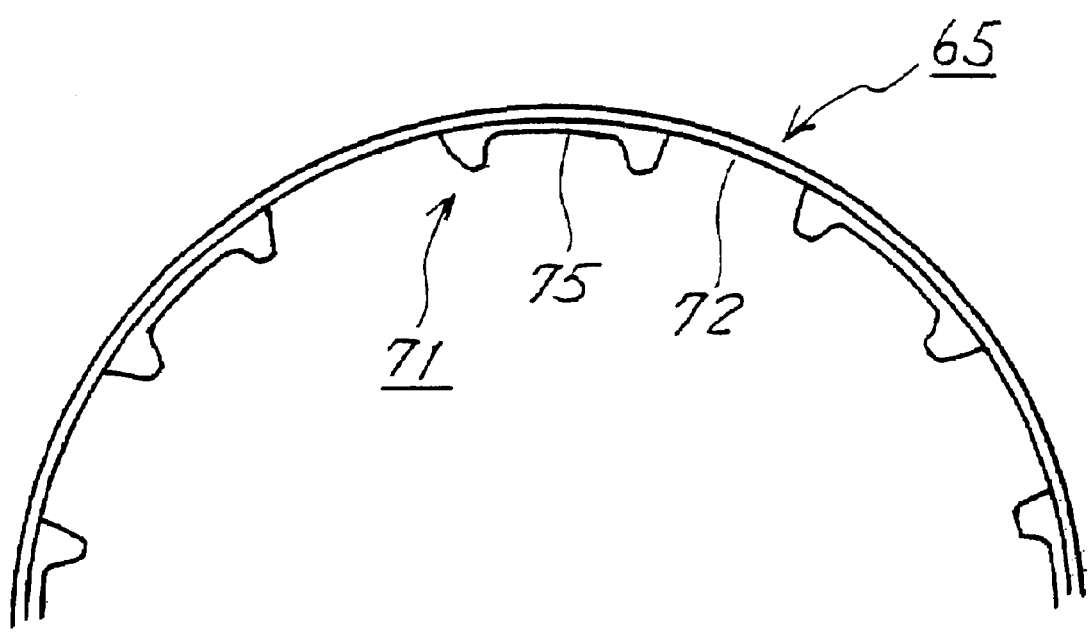
FIG. 1 is a transverse sectional view of a first meshing portion in accordance with an embodiment of the present invention.
Figure 2:
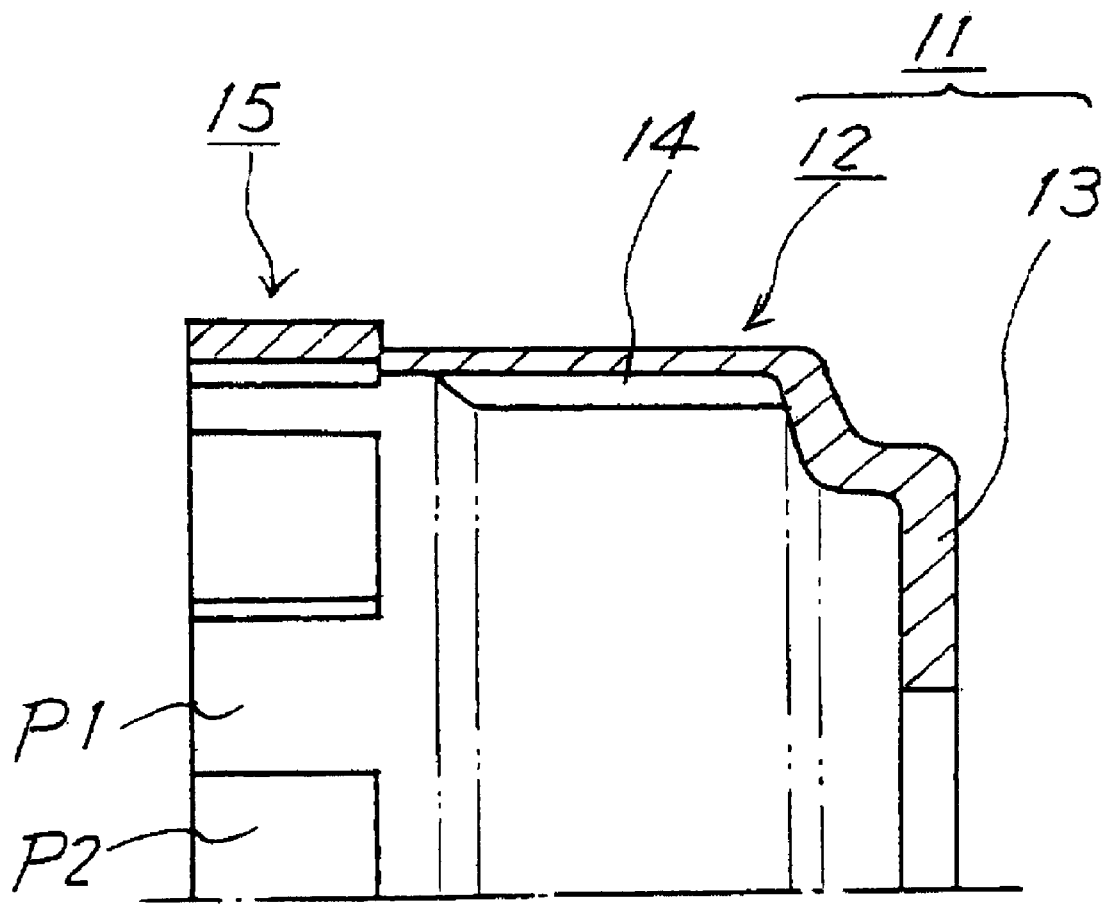
FIG. 2 is a longitudinal sectional view of the essential part of a drum having a meshing portion formed by the corrugation molding of the related art.
Figure 3:
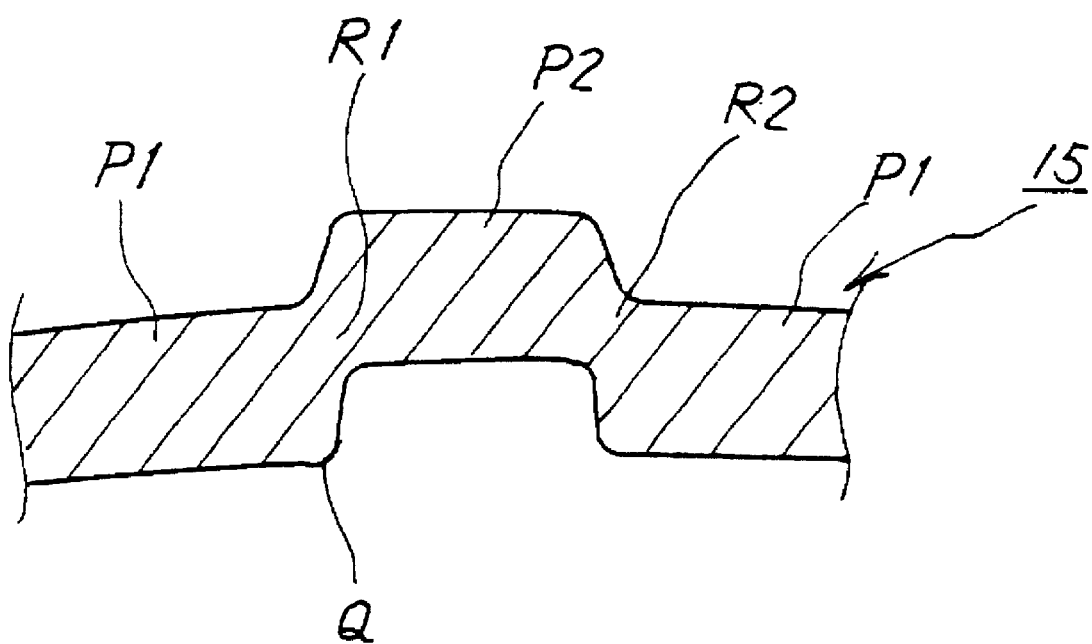
FIG. 3 is an enlarged view of the meshing portion formed by the corrugation molding of the related art.
Figure 4:
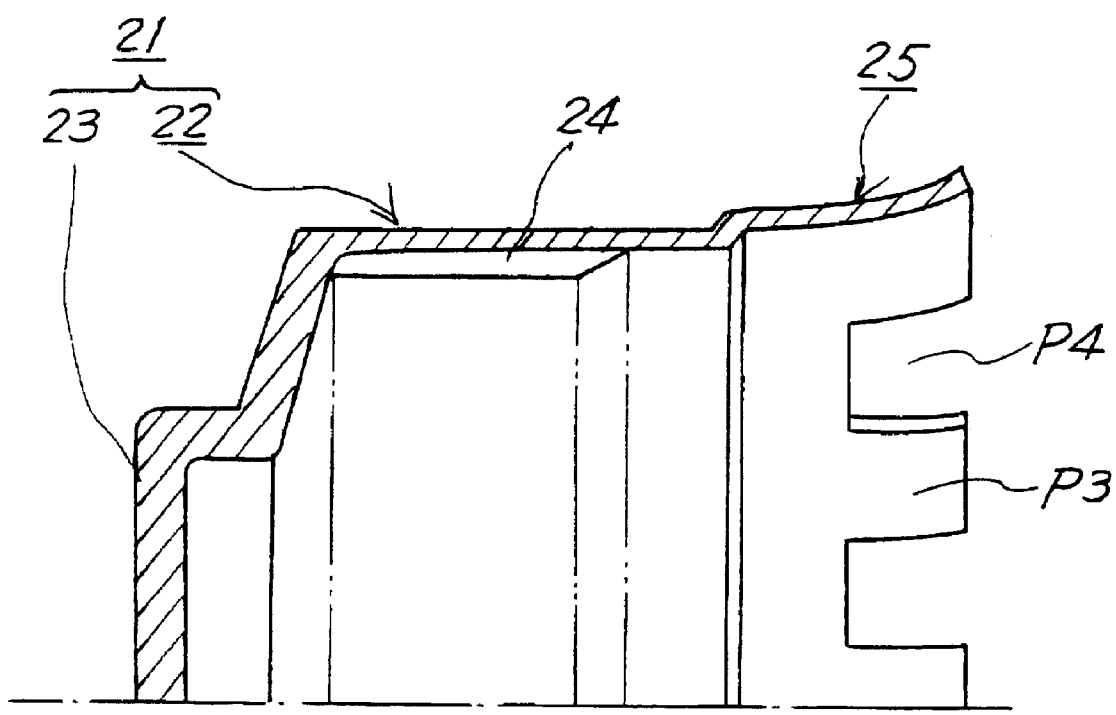
FIG. 4 is a longitudinal sectional view of the essential part of a drum having a meshing portion formed by the slot extraction process of the related art.
Figure 6:
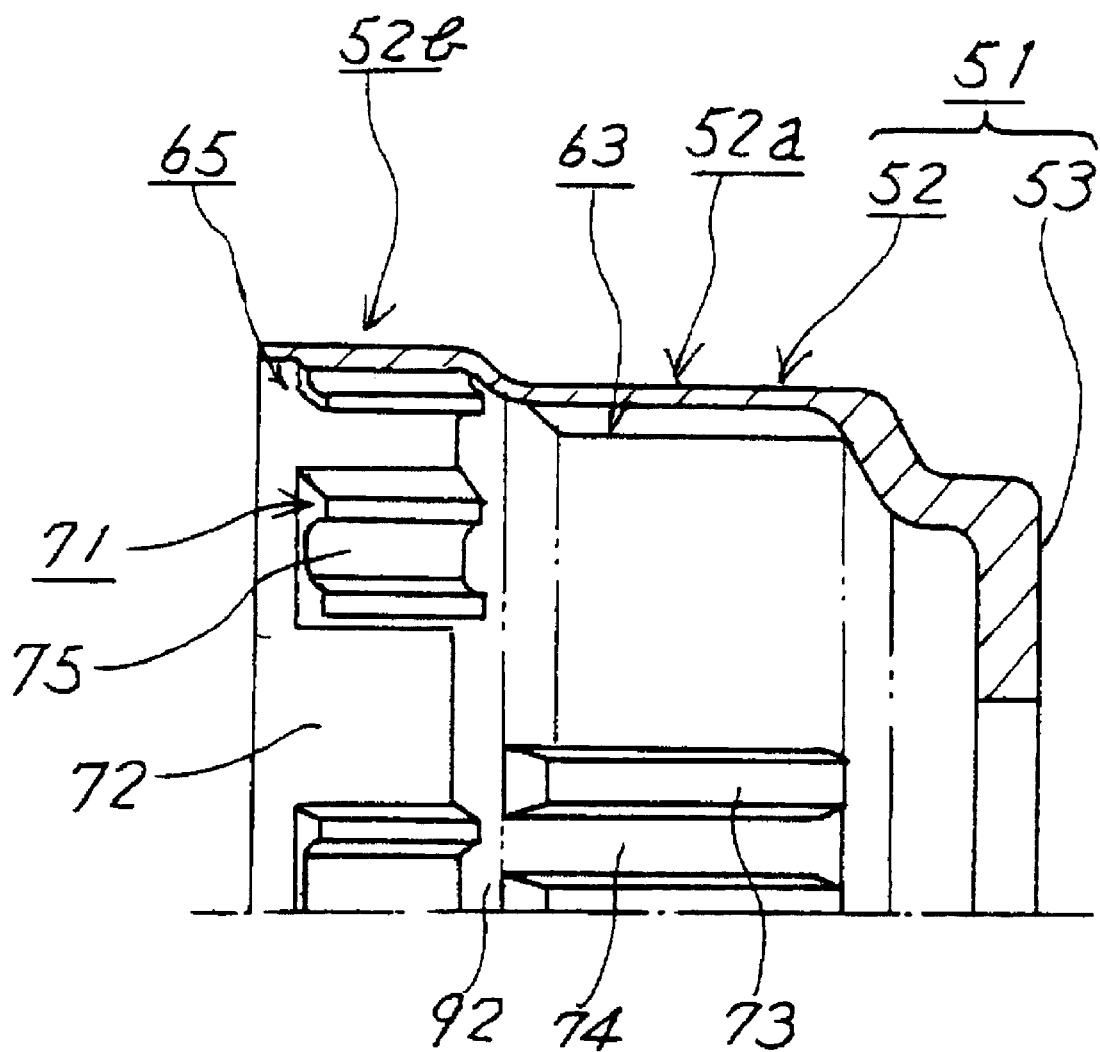
FIG. 6 is a longitudinal sectional view of the drum in accordance with the embodiment of the present invention.

Next, the drum 51 will be described with reference to FIGS. 1 and 6. FIG. 6 shows a drum 51 as including a trunk portion 52, and a bottom portion 53. The trunk portion 52 is composed of first and second cylinder portions 52a, 52b. By means of roll forming, the spline 63 is formed on the inner peripheral surface of the first cylinder portion 52a, and the first meshing portion 65 is formed on the inner peripheral surface of the second cylinder portion 52b.

Because the first meshing portion 65 is formed on the inner peripheral surface of the second cylinder portion 52b, the entire component is closed around its circumference. As a result, it becomes difficult to discharge lubricating oil circulating inside the drum 51. Thus, a groove 75, which is extended in the axial direction, is formed on the inner peripheral surface of the convex portion 71. Accordingly, lubricating oil circulating inside the drum 51 is easily discharged through the groove 75. Also, formation of the groove 75 correspondingly reduces the weight of the drum 51. In FIG. 6, a reference numeral 72 denotes a concave portion, a reference numeral 73 a spline tooth, a reference numeral 74 a spline groove, and a reference numeral 92 a flat portion which will be described later.

Next, a method of forming the drum 51 of the aforementioned construction will be described with reference to FIGS. 7–11. As shown in these drawing figures, on an outer peripheral surface of a mandrel 81 a first tooth die portion 82 is formed so as to correspond to the spline tooth 73 and the spline groove 74 of the spline 68 (FIG. 6), and a second tooth die portion 83 is formed corresponding to the convex portion 71 and the concave portion 72 of the first meshing portion 65. In the first and second tooth die portions 82, 83, first and second grooves (not shown) and first and second internal teeth (not shown) are formed, respectively. The first and second grooves and the first and second internal teeth are respectively arranged alternately around the circumference with an equal pitch. A convex portion, which is extended in the axial direction, is formed on the second groove in the second tooth die portion 83.

Also, a tail stock 85 designed as a sandwiching member is rotatably disposed facing the mandrel 81. A piece of stock material 86 is securely sandwiched between the mandrel 81 and the tail stock 85. The stock material 86 is fixed to the front end (the right end in FIGS. 7 and 8) of the mandrel 81. A plurality of molding rollers are rotatably and radially movably disposed around the mandrel 81 and the tail stock 85. In this embodiment, three molding rollers, namely, first through third molding rollers 87 through 89, are rotatably and radially movably disposed around the mandrel 81 and the tail stock 85. A first driving means (not shown) is disposed to axially displace the mandrel 81 and the tail stock 85. A second driving means (not shown) is disposed to displace the first through third molding rollers 87 through 89 in the radial direction of the mandrel 81. A third driving means (not shown) is provided to rotate the first through third molding rollers 87 through 89.

Figure 7:
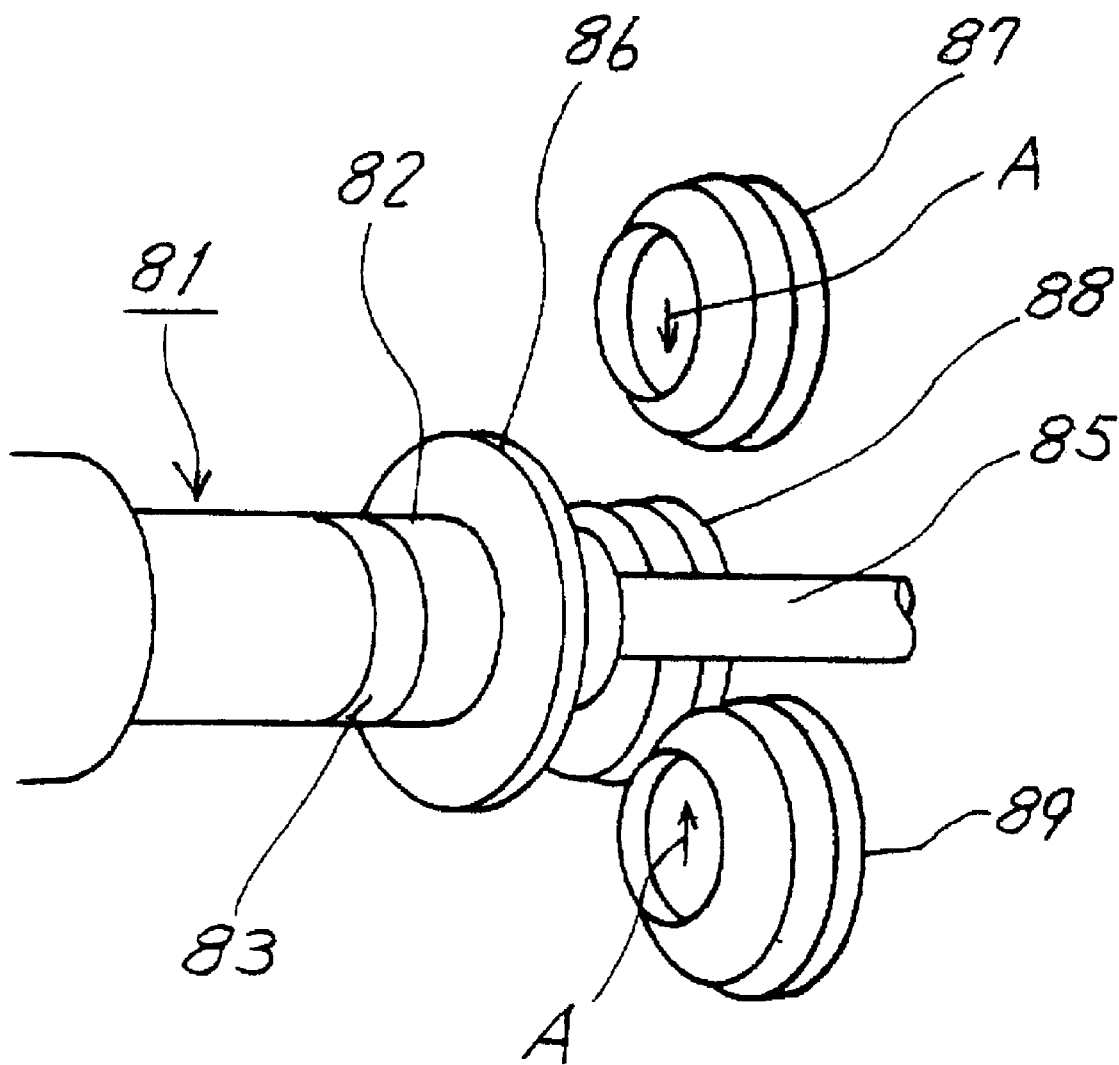
FIG. 7 is a perspective view showing one state of operation of a molding apparatus for forming the drum in accordance with the embodiment of the present invention.
Figure 8:
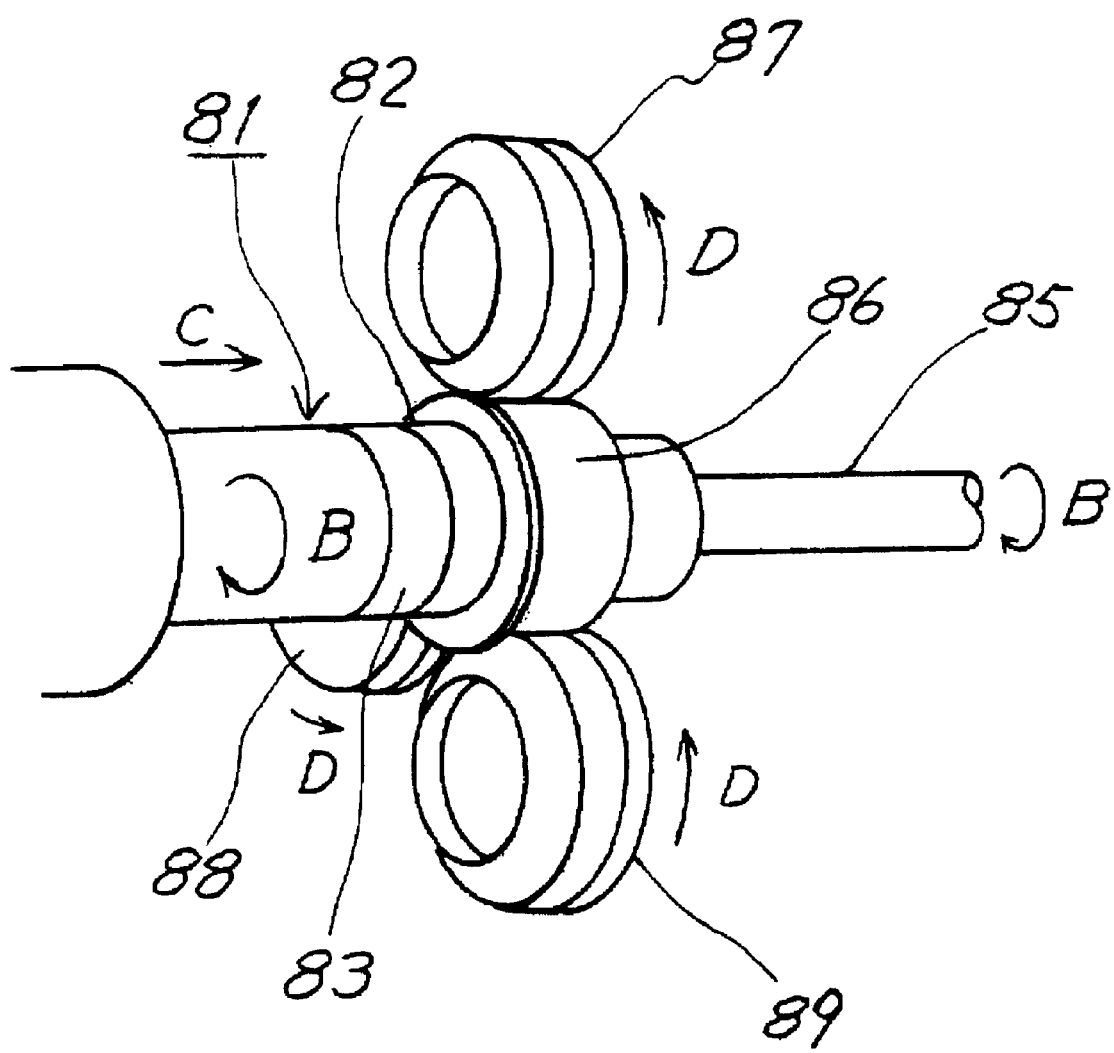
FIG. 8 is a perspective view showing another state of operation of the molding apparatus for the drum in accordance with the embodiment of the present invention.
Figure 9:
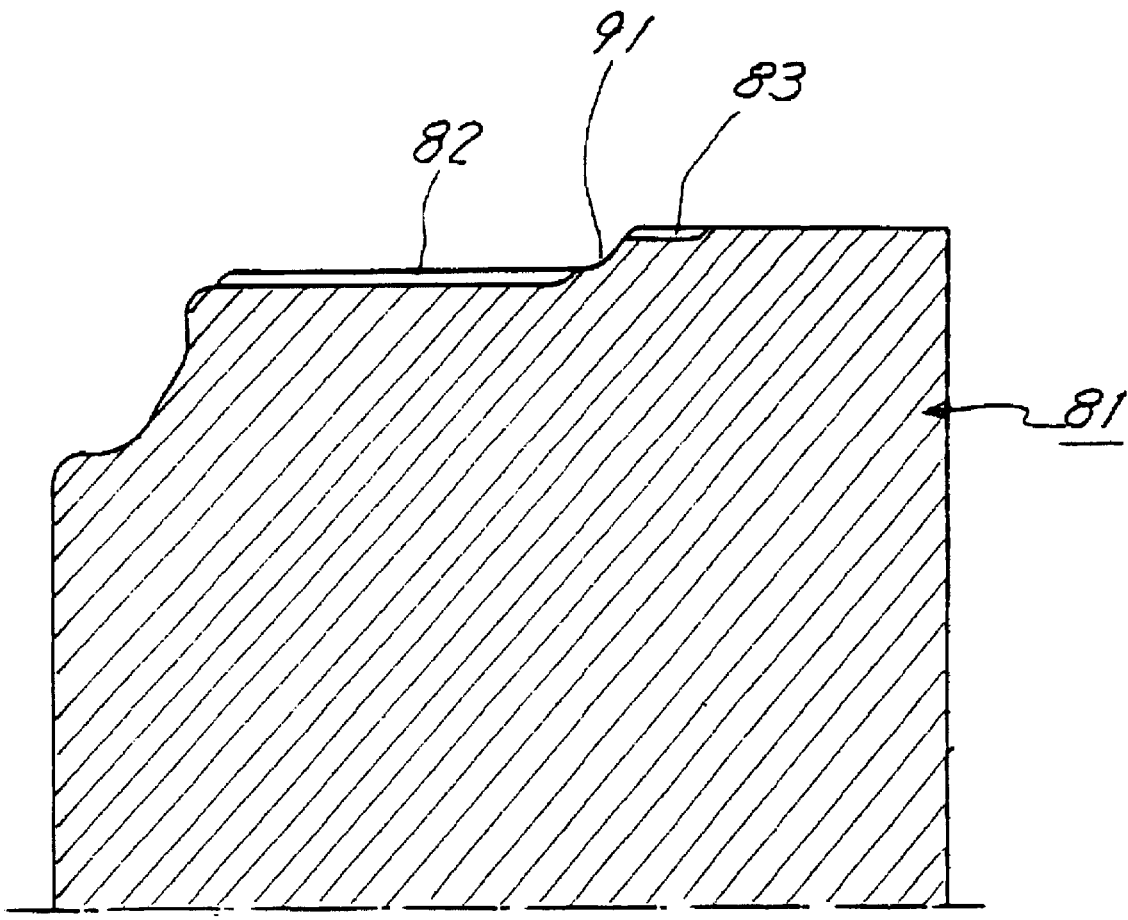
FIG. 9 is a sectional view of the essential part of a mandrel in accordance with the embodiment of the present invention.

In the molding apparatus of the aforementioned construction, displacement means for a control device (not shown) displaces the first through third molding rollers 87 through 89 towards the center of the mandrel 81 in the direction of an arrow A as shown in FIG. 7, and then displaces the mandrel 81 and the tail stock 8S in the direction of an arrow C while rotating them in the direction of an arrow B, and rotates the first through third molding rollers 87 through 89 in the direction of an arrow D while pressing them against the material 86. The first through third molding rollers 87 through 89 constitute a pressing member and pressing means.

Figure 10:
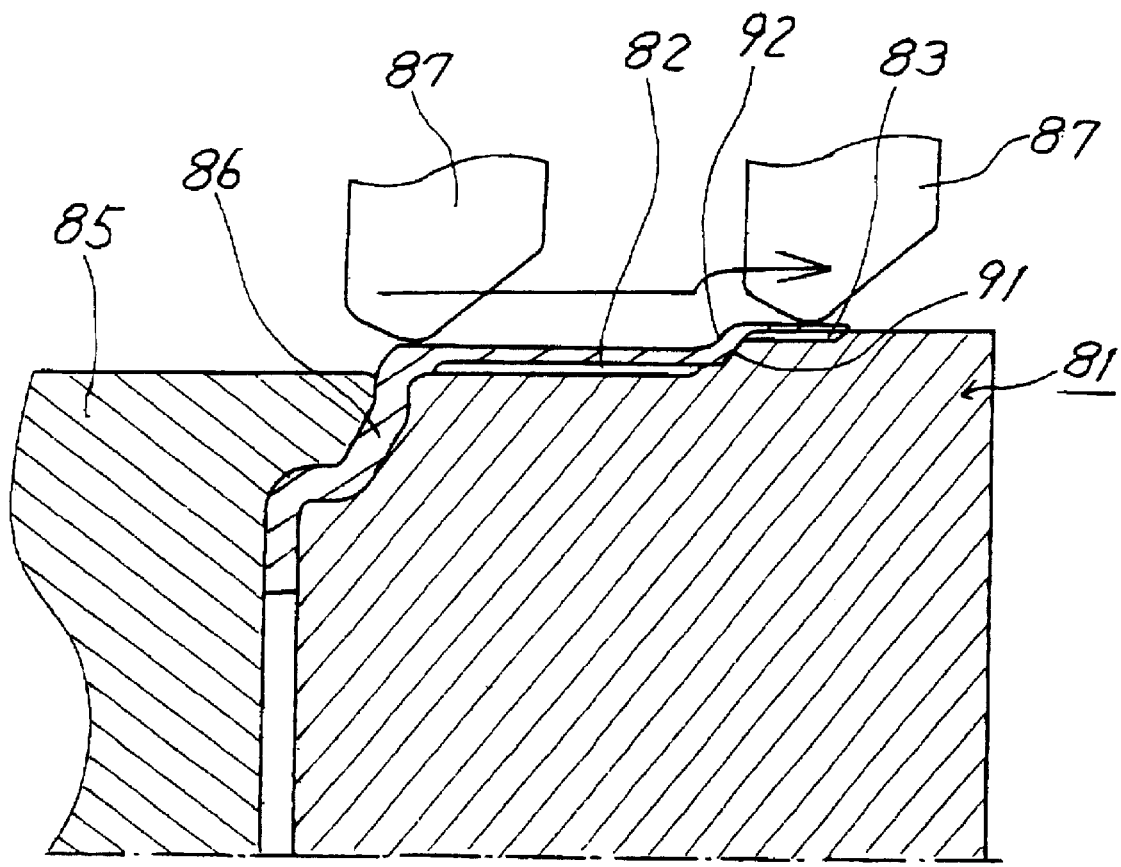
FIG. 10 is a first drawing showing a method of forming (molding) the drum in accordance with the embodiment of the present invention.

As a result, as shown in FIG. 10, the stock material (blank) 86 is pressed against the mandrel 81 by the first through third molding rollers 87 through 89, caused to undergo plastic flow, and is thereby shaped. On the inner peripheral surface of the drum 51 is formed the spline 63 having a shape corresponding to the first tooth die portion 82 and the first meshing portion 65 having a shape corresponding to the second tooth die portion 83. The material of blank 86 is forced into the first groove in the first tooth die portion 82 to form the spline teeth 73. At the same time, the spline grooves 74 corresponding to the first internal teeth are formed among the spline teeth 73. Further, material of blank 86 is forced into the second groove in the second tooth die portion 83 to form the convex portions 71. The concave portions 72 corresponding to the second internal teeth are formed among the convex portions 71. The grooves 75 corresponding to the convex portion in the second groove are formed in the convex portions 71.

In the roll forming operation, because the first and second grooves have a cross sectional shape of an inverse trapezoid, the material of the blank 86 easily enters the first and second grooves. In other words, the first and second grooves have a width which decreases in accordance with an increase in depth. Accordingly, the spline teeth 73 and the convex portions 71 have a cross-sectional shape of a trapezoid whose width decreases in accordance with a decrease in distance from the center or the drum 51, and the spline grooves 74 and the concave portions 72 have a cross-sectional shape of an inverse trapezoid whose width increases in accordance with a decrease in distance from the center of the drum 51. As described above, the convex portions 71 are engaged with the non-worked portions P11, and the concave portions 72 are engaged with the processed portions P12. It is preferable that the non-processed portions P11 be formed in a shape corresponding to the convex portions 71 and that the processed portions P12 be formed in a shape corresponding to the concave portions 72.

An annular flat portion 91 is formed between the first and second tooth die portions in the axial direction of the drum 51. In a portion of the drum 51 where the first second and cylinder portions 52a, 52b are coupled to each other, the annular flat portion 92 is formed so as to correspond to the flat portion 91. Thus, while the spline 63 is being formed, the first meshing portion 65 can be prevented from being affected by plastic flow of the material 86. As a result, the first meshing portion 65 can be formed with ease.

In this manner, the convex portions 71 are formed to protrude from the inner peripheral surface of the second cylinder portion 52b, whereby it becomes possible to form the first meshing portion 65. Therefore, the drum 51 does not require an increase in diameter. Further, since it is unnecessary to form the meshing portion by means of corrugation molding, there is no possibility of the worked (processed) portions formed by corrugation molding being extruded radially outwardly. Accordingly, it is possible to reduce the size of the drum 51. Therefore, it is possible to prevent the drum 51 from interfering with another component of the automatic transmission, such as the automatic transmission case.

Because the drum 51 has a tubular shape, the outer peripheral surface of the drum 51 can be used as the engaging surface for the band brake.

Further, since the spacing (distance) between the convex portions 71 and the concave portions 72 does not decrease during formation of the convex portions 11, generation of cracks can be prevented. As a result, the durability of the drum 51 is enhanced. Furthermore, since there is no sag at the corner portions of the inner peripheral surface of the first meshing portion 65, the quality of the drum 51 is further improved.

Further, the convex portions 71 are integrally coupled to the concave portions 72, Thus, even if a centrifugal force is applied to the drum 51 during its rotational motion, the convex portions 71, the concave portions 72 and the like are not deformed. Accordingly, the durability of the drum 51 is further enhanced.

Besides, since the spline 63 and the first meshing portion 65 can be simultaneously formed in a single roll forming step, the number of process steps is reduced. As a result, it is possible to improve productivity in manufacture of the drum 51. In addition, it is possible to maintain precision in the relative positioning between the spline 63 and the first meshing portion 65 and, as a result the quality of the drum 51 is further improved.

The first through third molding rollers 87–89 are used for finishing, trying and roughing, respectively, of the roll forming and are, respectively, a finishing roller, a trying roller and a roughing roller. Hence, the axes and processing surfaces of the first through third molding rollers 87–89 are disposed slightly differently from one another in the axial and radial directions corresponding to the dimensions of the mandrel 81.

Figure 11:
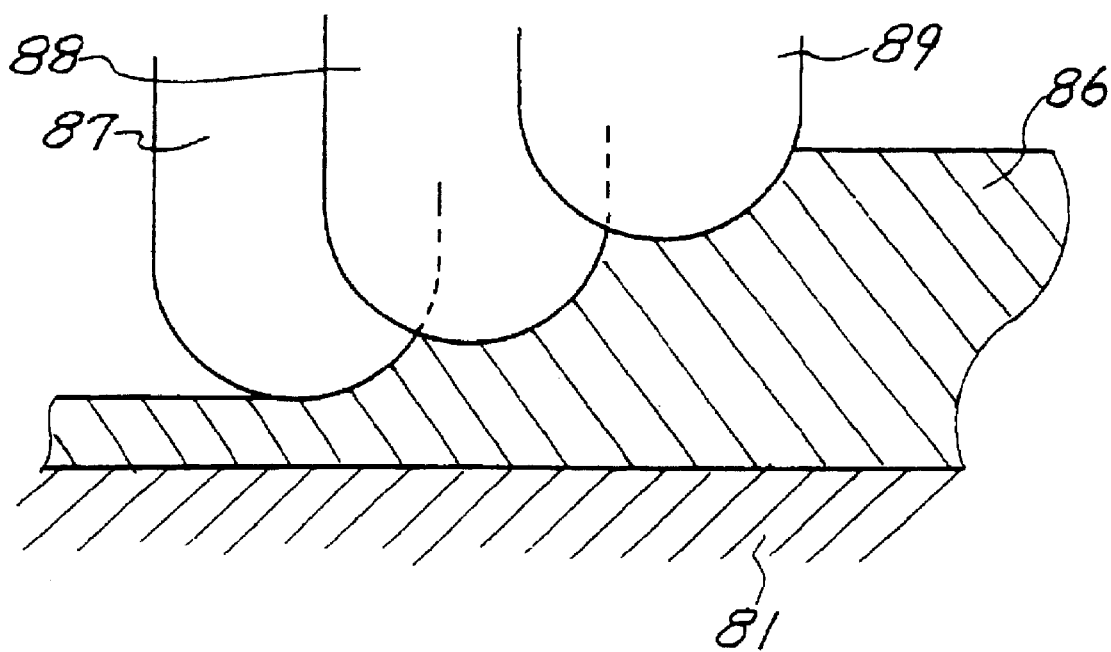
FIG. 11 is a second drawing showing the method of forming the drum in accordance with the embodiment of the present invention.

That is, as shown in FIG. 11, in the axial direction of the mandrel 81, the first through third molding rollers 87–89 are arranged in this order, from the upstream side to the downstream side, in the direction of roll forming machining (in the direction of an arrow in FIG. 10). In the radial direction of the mandrel 81, the first through third molding rollers 87 through 89 are arranged in this order in accordance with increase in distance from the axis of the mandrel 81.

Accordingly, the material 86 is pressed against the mandrel 81 sequentially by the third, second and first rollers 89, 88 and 87. As the process of roll forming proceeds, the material 86 decreases in thickness. In this manner, the material 86 is gradually made thinner. Therefore, even in the case where the material 86 is initially thick, a sufficiently thin drum 51 can be formed by means of roll forming machining without adversely affecting its quality.

In this case radial and axial positions of the first through third molding rollers 87 through 89 and forces for pressing the material 88 against the first through third molding rollers 87–89 are set and controlled through NC control, which is performed by the displacement processing means. Accordingly, it is possible to enhance the precision of the spline teeth 73, the spline grooves 74 and the like in the spline 63 as well as the precision of the convex portion 71, the concave portion 72, the groove 75 and the like in the first meshing portion 6S.

Next a procedure of changing radial and axial positions of the first through third molding rollers 87–89 will be described with reference to FIGS. 12–19. For convenience of explanation, it is assumed that the first through third molding rollers 87–89 are disposed at the same axial position relative to the mandrel 81. The material 86 is not shown in these drawing figures.

A mandrel 81 is shown as displaceable in the direction of the arrow C. The first and second tooth die portions 82, 83 and the flat portion 91 are formed on the outer peripheral surface of the mandrel 81. The first tooth die portion 82 is smaller in diameter than the second tooth die portion 83. The flat portion 91 constitutes a step which is slantingly formed on the outer peripheral surface of the mandrel 81.

Molding surfaces S1 through S3 are formed on outer peripheral surfaces of the first through third molding rollers 87–89, respectively. Reference numbers 87a through 89a respectively denote upstream-side end surfaces of the first through third molding rollers 87–89 in the direction of progress of the roll forming machining (in the direction of the arrow in FIG. 10). Reference numerals 87b through 89b respectively denote downstream-side end surfaces of the first through third molding rollers 87–89 in the direction of progress of roll forming machining.

The molding surface S1 is provided with a maximum diameter portion m1, a first incline portion n1, a steep incline portion r1, 4 and a second incline portion p1. In the maximum diameter portion S m1, the first molding roller 87 assumes its maximum outer diameter. The first incline portion n1 is formed to be closer to the end surface 87a than the maximum diameter portion m1, and gradually decreases in outer diameter in accordance with an increase in distance from the maximum diameter portion m1. The steep incline portion r1 is formed to be closer to the end surface 87b than the maximum diameter portion m1, and abruptly decreases in outer diameter. The second incline portion p1 is formed to be closer to the end surface 87b than the steep incline portion r1, and decreases in outer diameter in accordance with an increase in distance from the steep incline portion r1. Further, the molding surface S2 is provided with a maximum diameter portion m2, a first incline portion n2, and a second incline portion p2. In the maximum diameter portion m2, the second molding roller 88 assumes its maximum outer diameter. The first incline portion n2 is formed to be closer to the end surface 88a than the maximum diameter portion m2, and decreases in outer diameter in accordance with an increase in distance from the maximum diameter portion m2. The second incline portion p2 is formed to be closer to the end surface 88b than the maximum diameter portion m2, and decreases in outer diameter in accordance with an increase in distance from the maximum diameter portion m2. The molding surface S3 is provided with a maximum diameter portion m3, a first incline portion n3, a second incline portion p3, a minimum diameter portion t3, and a convex portion q3. In the maximum diameter portion m3, the third molding roller 89 assumes its maximum outer diameter. The first incline portion n3 is formed to be closer to the end surface 89a than the maximum diameter portion m3, and decreases in outer diameter in accordance with an increase in distance from the maximum diameter portion m3. The second incline portion p3 is formed to be closer to the end surface 89b than the maximum diameter portion m3, and decreases in outer diameter in accordance with an increase in distance from the maximum diameter portion m3. In the minimum diameter portion t3, the third molding roller 89 assumes its minimum outer diameter. The convex portion q3 is formed to he closer to the end surface 89b than the minimum diameter portion t3, and increases in outer diameter in accordance with an increase in distance from the minimum diameter portion t3.

In pressing the material 86 against the mandrel 81, the maximum diameter portions m1 through m3 contribute most to deformation of the material 86. Angles formed by the first incline portions n1 through n3 with the outer peripheral surface of the mandrel 81, namely, angle of inclination of the first incline portions n1 through n3 are defined as $\theta 1$ through $\theta 3$ respectively. Angles of inclination formed by the second incline portions p1 through p3 with the outer peripheral surface of the mandrel 81 are defined as $\theta 11$ through $\theta 13$ respectively. An angle of inclination formed by the steep incline portion r1 with the outer peripheral surface of the mandrel 81 is defined as $\theta 21$. In this case the angles of inclination $\theta 1$ through $\theta 3$, $\theta 11$ through $\theta 13$ and $\theta 21$ satisfy the following relationships:

$$\theta 21 = \theta 2$$
$$= \theta 12$$
$$= \theta 11$$
$$> \theta 13$$
$$> \theta 3$$
$$> \theta 1$$

As the angles of inclination $\theta 11$ through $\theta 13$ increase, they contribute more to reduction of thickness of the material 86.

Figure 12:
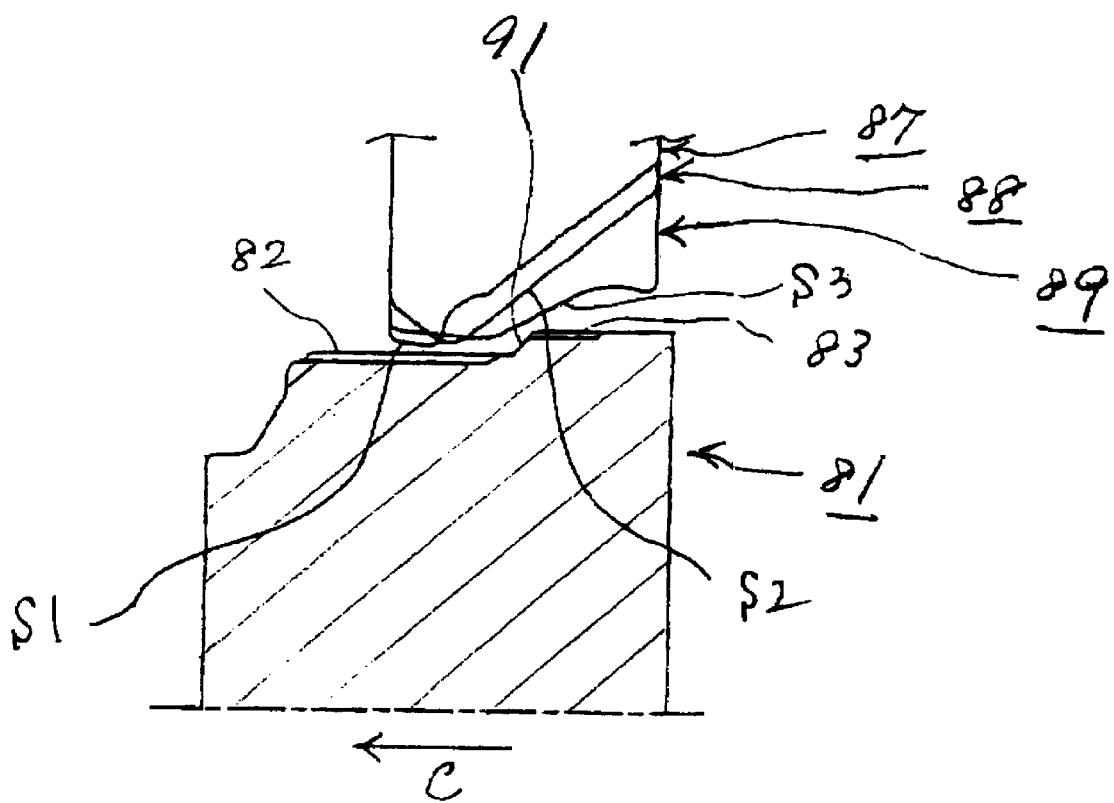
FIG. 12 is a first drawing for illustrating the radial and axial positions of first through third molding rollers in accordance with the embodiment of the present invention.
Figure 13:
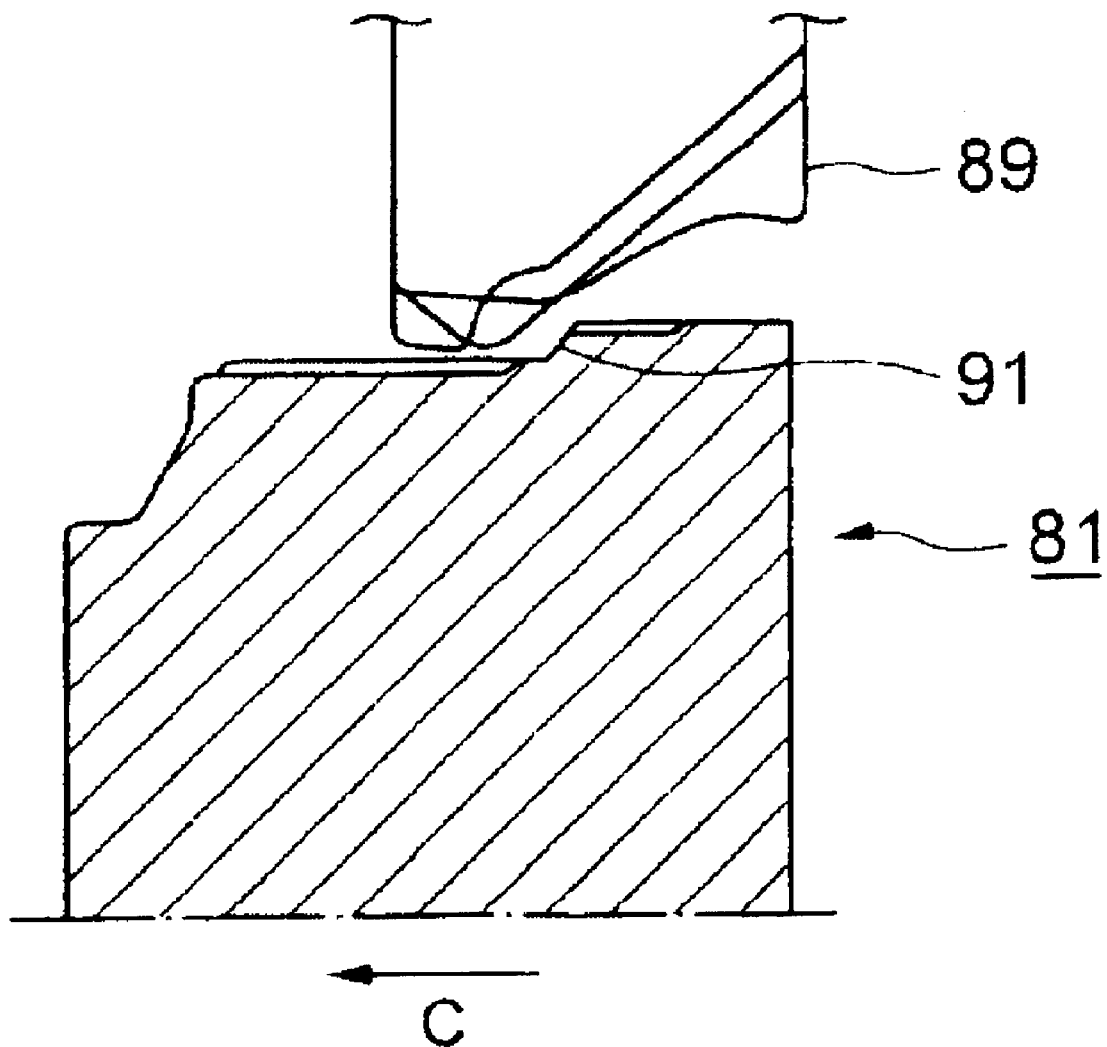
FIG. 13 is a second drawing illustrating radial and axial positions of the first through third molding rollers in accordance with the embodiment of the present invention.
Figure 14:
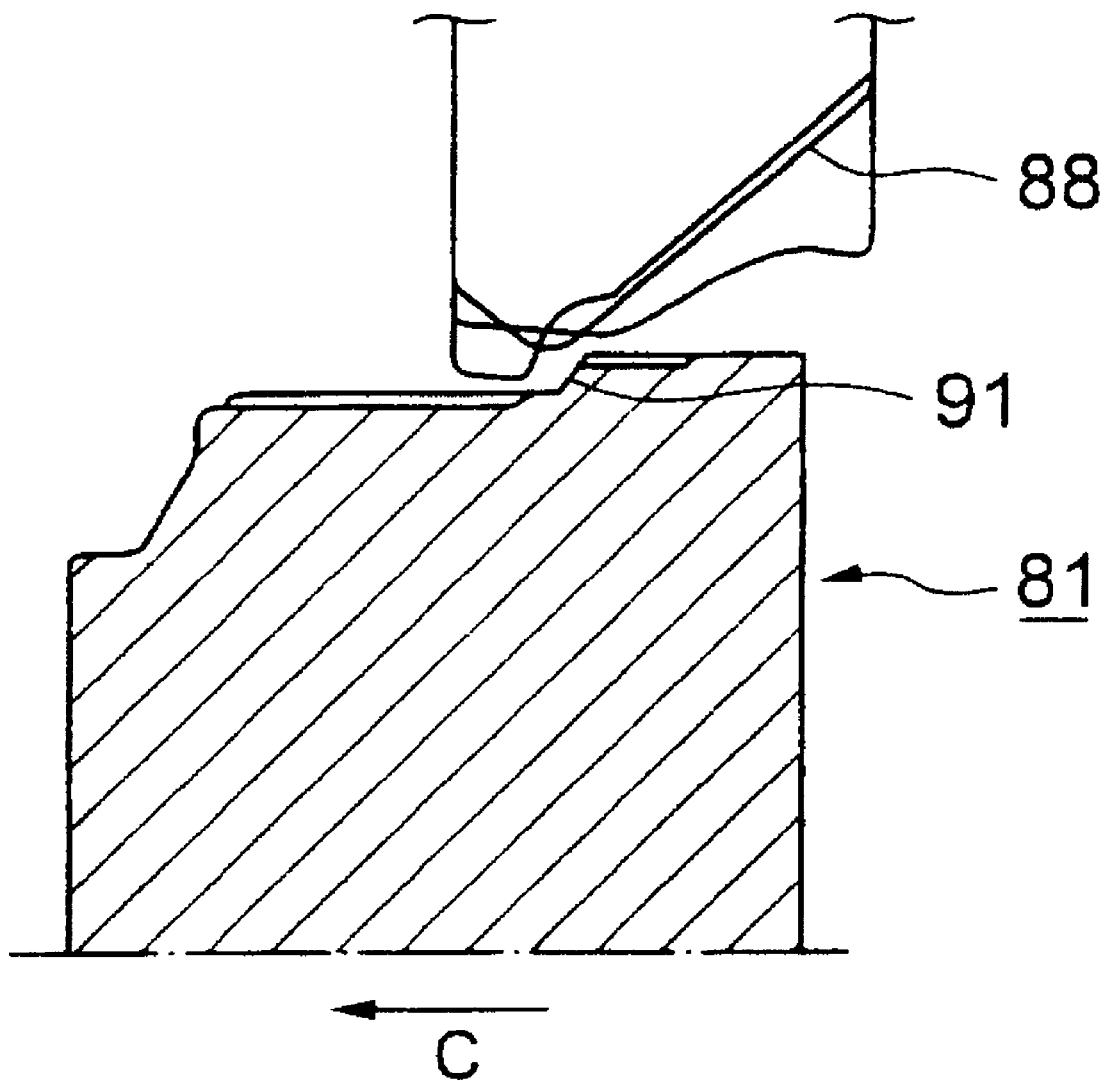
FIG. 14 is a third drawing illustrating radial and axial positions of the first through third molding rollers in 11 accordance with the embodiment of the present invention.
Figure 15:
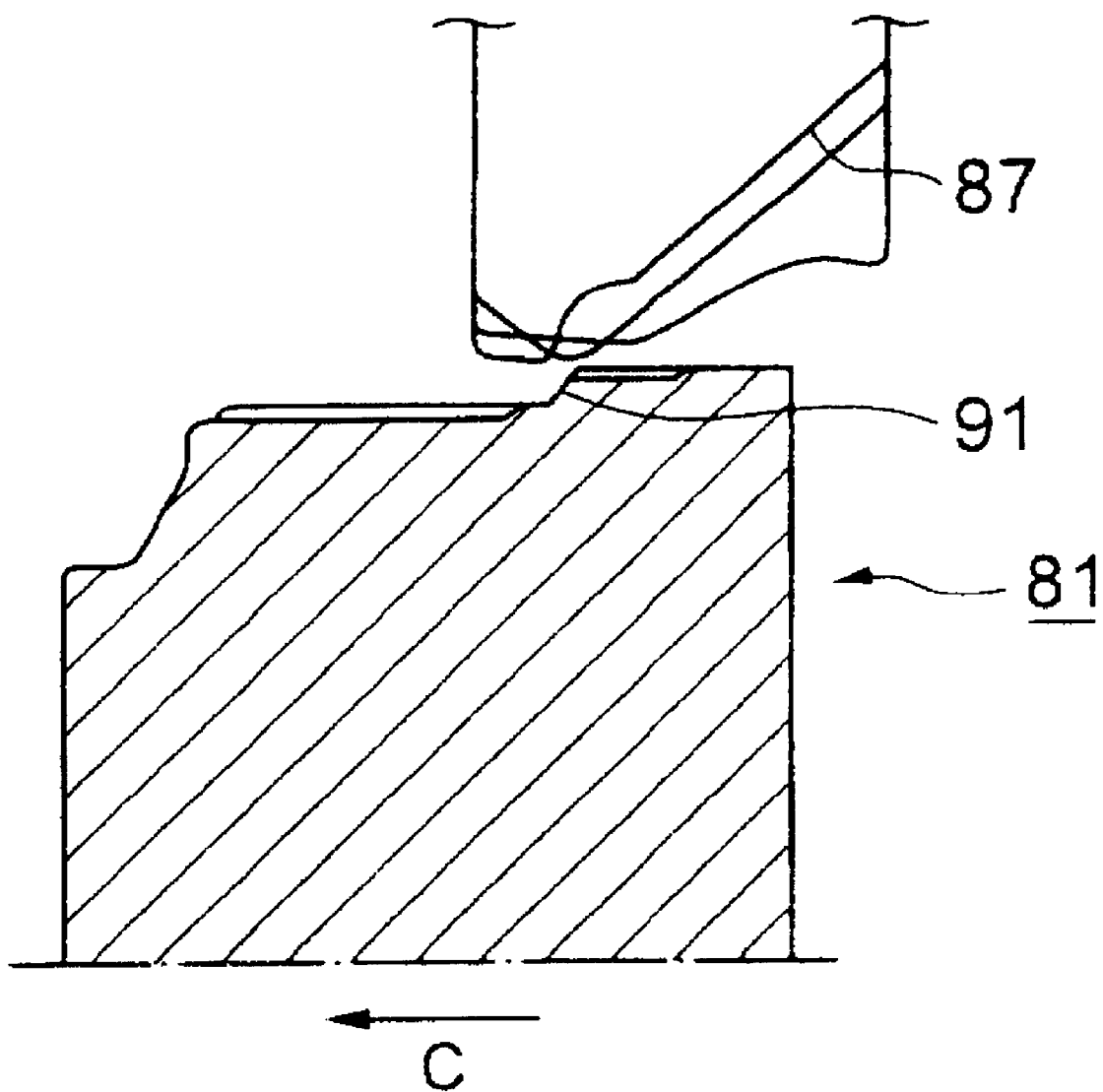
FIG. 15 is a fourth drawing illustrating radial and axial positions of the first through third molding rollers in accordance with the embodiment of the present invention.
Figure 16:
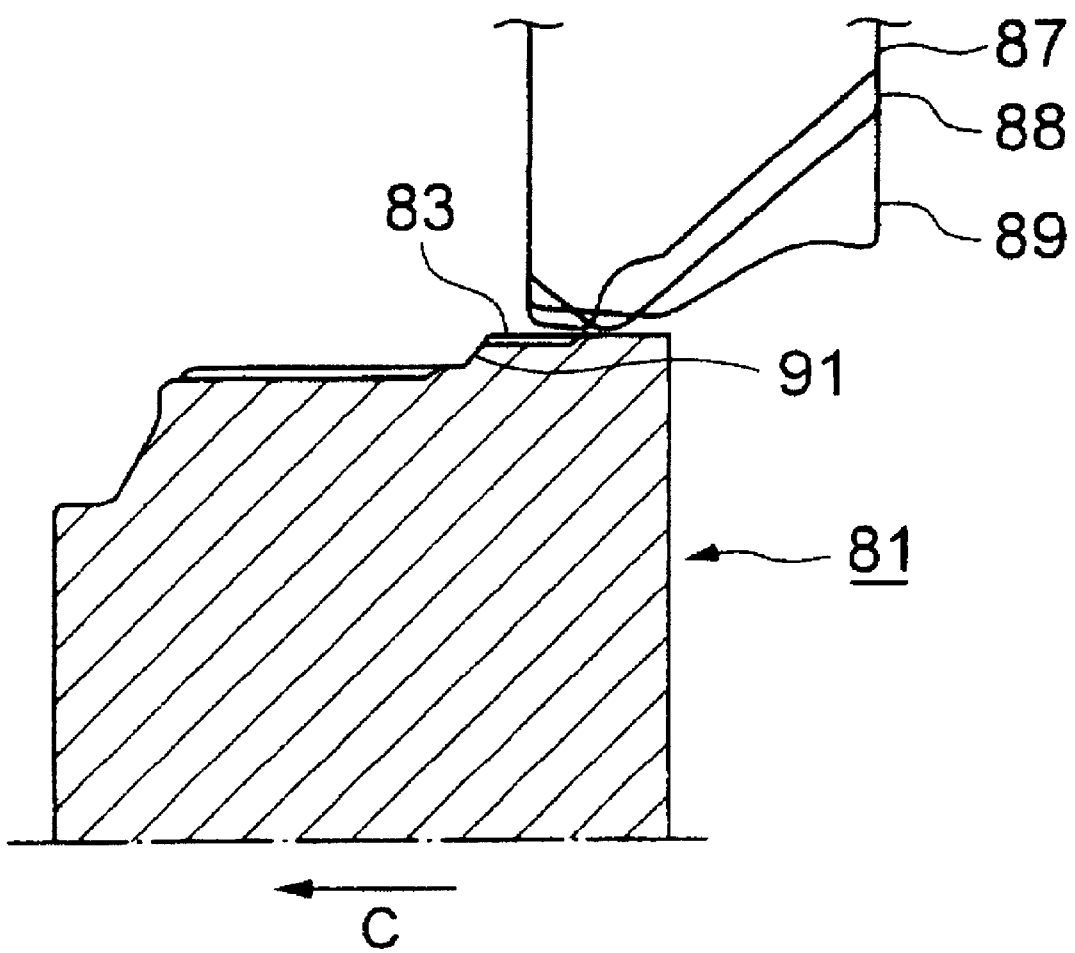
FIG. 16 is a fifth drawing illustrating radial and axial positions of the first through third molding rollers in accordance with the embodiment of the present invention.
Figure 17:
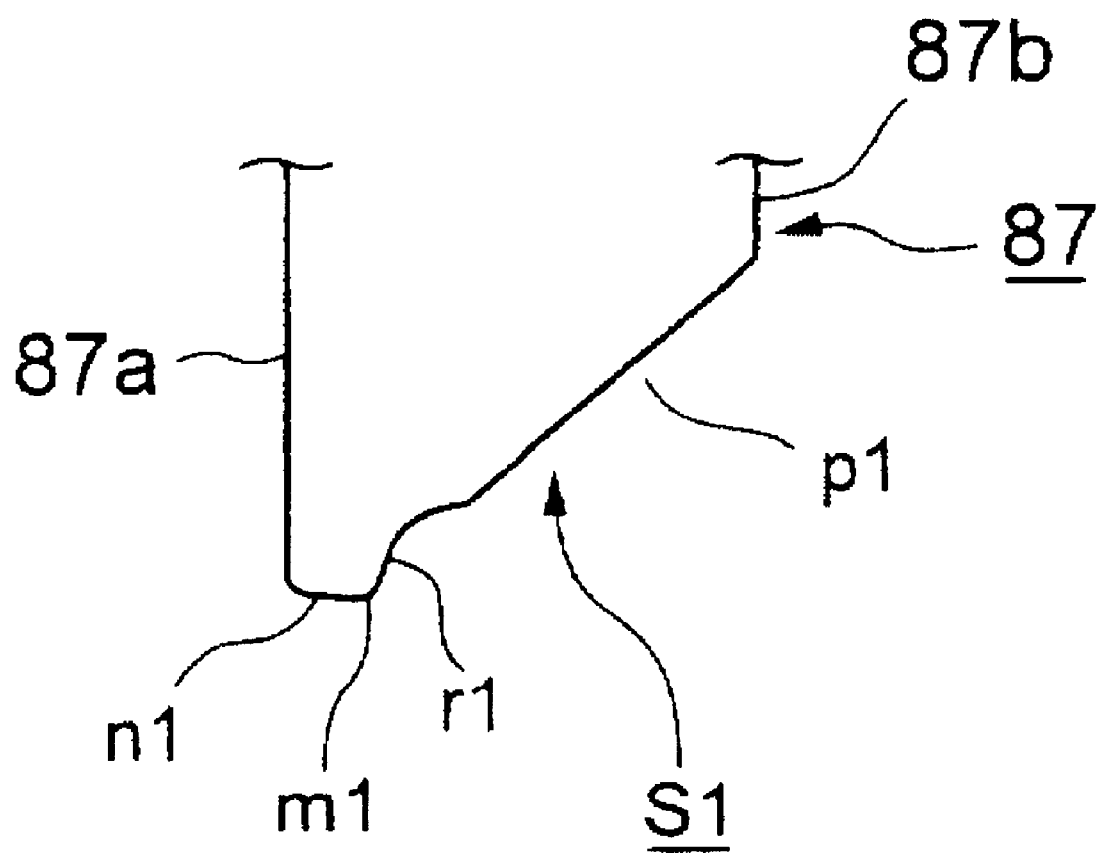
FIG. 17 is a drawing showing a molding surface of the first molding roller in accordance with the embodiment of the present invention.
Figure 18:
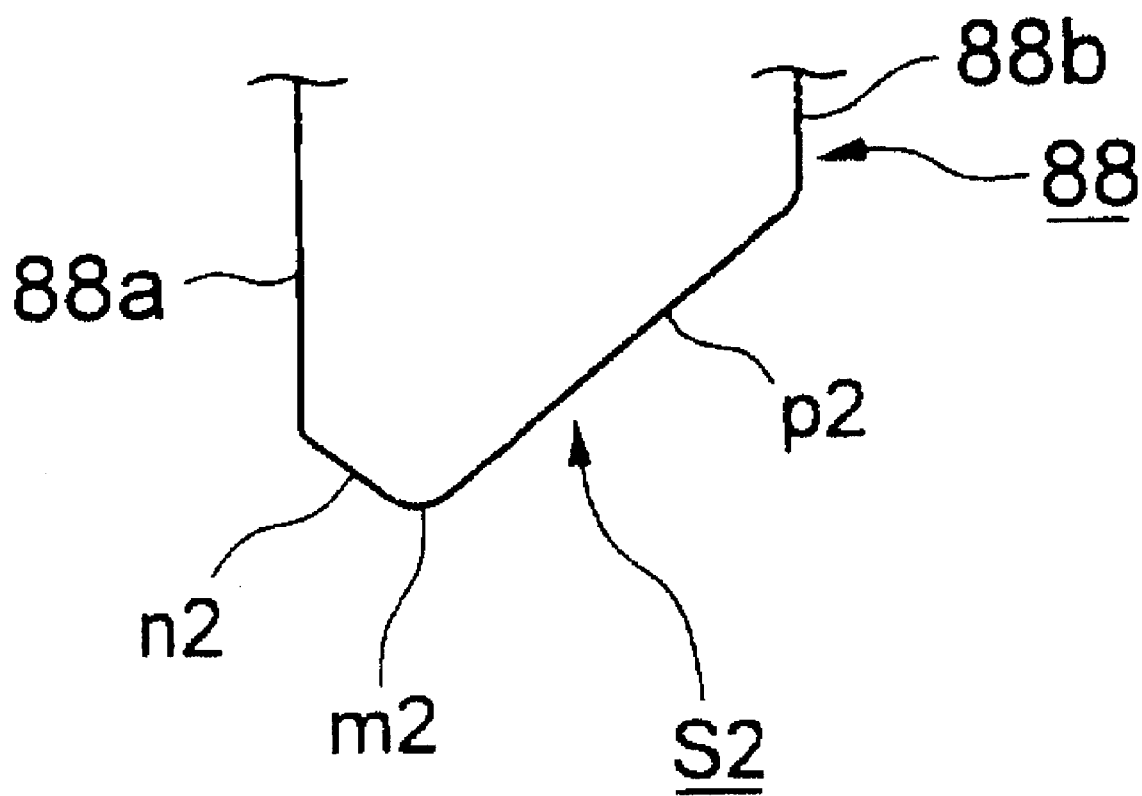
FIG. 18 is a drawing showing a molding surface of the second molding roller in accordance with the embodiment of the present invention.
Figure 19:
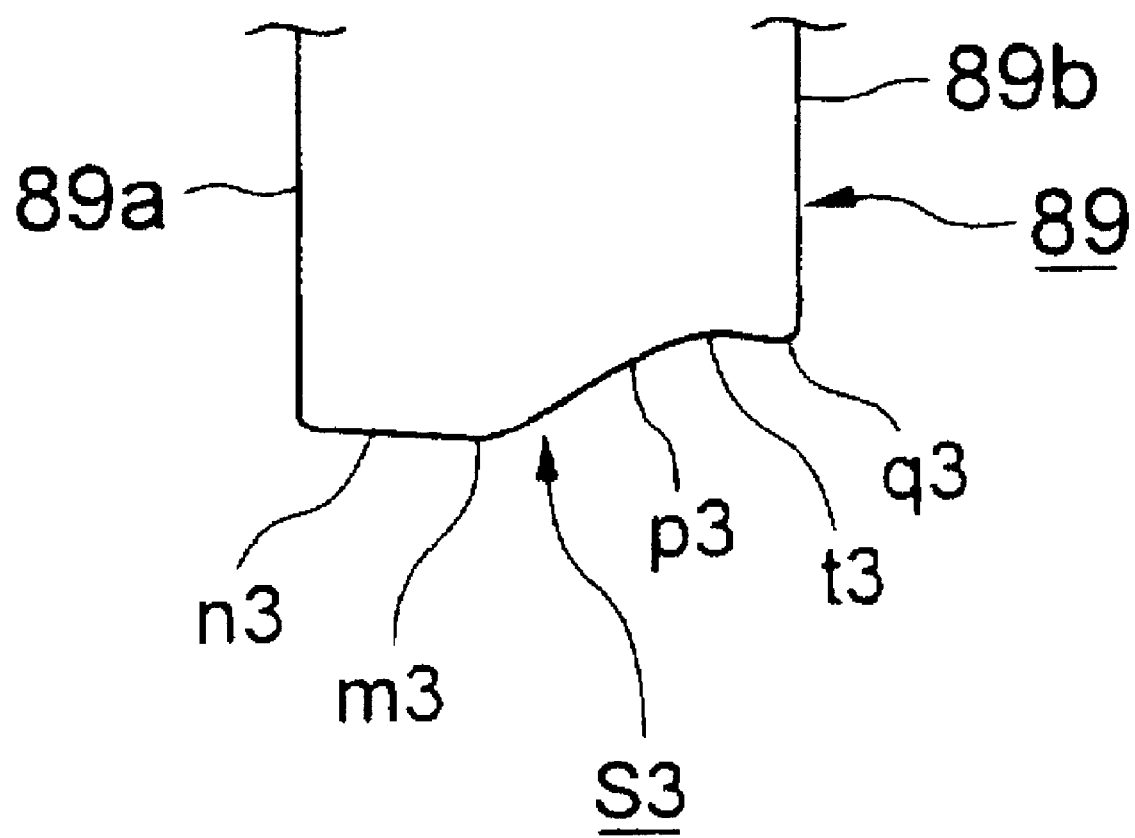
FIG. 19 is a drawing showing a molding surface or the third molding roller in accordance with the embodiment of the present invention.

If the displacement processing means displaces the mandrel 81 in the direction of the arrow C, the material 86 is deformed so that the first cylinder portion 52a, the flat portion 92 and the second cylinder portion 52b are sequentially formed. The flat portion 92 constitutes a stepped portion. That is, in a state where the mandrel 81 has been displaced with the first tooth die portion 82 facing the first through third molding rollers 87–89 and where the first cylinder portion 52a is formed, if the flat portion 91 approaches the first through third molding rollers 87–89 as shown in FIG. 12, the displacement processing means displaces radially outwardly the third molding roller 89, the second molding roller 88 and the first molding roller 87, in this order, while displacing the mandrel 81 in the direction of the arrow C. As a result, the flat portion 92 is formed so as to correspond to the flat portion 91. Thereafter, as shown in FIG. 16, the mandrel 81 is displaced with the second tooth die portion 83 facing the first through third molding rollers 87–89, so that the second cylinder portion 52b is formed.

In the third molding roller 89, the angle of inclination of the second incline portion p3 is relatively small, and the convex portion q3 is formed to be closer to the end surface 89b than the minimum diameter portion t3. Thus, when the material 86 is tumbled by the third molding roller 89, the outer peripheral edge of the material 86 is curved by the convex portion q3 to be brought relatively close to the outer peripheral surface of the mandrel 81. Accordingly it is possible to reduce the tensile stress in forming a boundary portion between the trunk portion 52 and the bottom portion 53. Therefore, the boundary portion between the trunk portion 52 and the bottom portion 53 can be formed with a sufficient thickness.

Further, in the first molding roller 87, the angle of inclination $\theta 21$ of the steep incline portion r1 is larger than the angles of inclination $\theta 1$, $\theta 22$ of the first and second incline portions n1, p1. Therefore, it is possible to sufficiently press the material 88 against the root of the flat portion 91. Accordingly, the precision of forming the convex portion 71 and the spline tooth 73 is enhanced.

In this embodiment, the first through third molding rollers 87–89 are disposed slightly differently from one another in the axial direction of the mandrel 81. However, it is also possible to dispose the first through third molding rollers 87–89 at the same axial position.

In this embodiment, the first through third molding rollers 87–89 are displaced in the axial direction of the first tooth die portion 82, whereby the spline 63 and the first meshing portion 65 are formed. However, it is also possible to displace the first through third molding rollers 87θ89 in a direction other than the axial direction of the first tooth die portion 82, depending on configurations, lengths and the like of the convex portion 71 and the concave portion 72. In addition, the first through third molding rollers 87–89 can also be displaced in different directions.

Further, in this embodiment, the spline 63 and the first meshing portion 65 are formed in the drum 51 in two steps. However, it is also possible to form only the spline in two steps.

While the present invention has been described with reference to what is presently considered to be a preferred embodiment thereof, it is to be understood that the invention is not limited to the disclosed embodiment. On the contrary, the invention is intended to cover various modifications and equivalent arrangements.

What is claimed is:

1. A method of forming an internally-toothed member, comprising the steps of:

deforming a material by causing it to undergo plastic flow to form a first cylinder portion and a second cylinder portion, said second cylinder portion having a diameter which is larger than that of said first cylinder portion;

forming a first plurality of spaced, axially extending internal teeth protruding radially inwardly from a first inner peripheral surface of said first cylinder portion;

forming a second plurality of spaced, axially extending internal teeth protruding radially inward from a second inner peripheral surface of said second cylinder portion to axially extending teeth surfaces concentric with said second inner peripheral surface; and forming axially extending oil grooves in and coextensive with said teeth surfaces.

2. The method according to claim 1, wherein:

the material is pressed against a mandrel by a plurality of pressing means which are disposed at different positions relative to the axial and radial dimensions of the mandrel.

3. The method according to claim 2, wherein: the pressing means are displaced radially outwardly after formation of the first cylinder portion and then form the second cylinder portion.

4. An internally-toothed member produced by a method according to claim 1, and comprising said first cylinder portion and said second cylinder portion, said second cylinder portion having a diameter which is larger than that of said first cylinder portion, and said first and second pluralities of spaced internal teeth which protrude radially inwardly from inner peripheral surfaces of said first and second cylinder portions, respectively.

* * * * *